(12) United States Patent
Hum et al.

(10) Patent No.: US 9,037,903 B2
(45) Date of Patent: May 19, 2015

(54) APPARATUS AND METHOD FOR PARTIAL MEMORY MIRRORING

(71) Applicants: Herbert H Hum, Portland, OR (US); Ganesh Kumar, Fort Collins, CO (US); Robert C Swanson, Olympia, WA (US); David Bubien, Fort Collins, CO (US)

(72) Inventors: Herbert H Hum, Portland, OR (US); Ganesh Kumar, Fort Collins, CO (US); Robert C Swanson, Olympia, WA (US); David Bubien, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 208 days.

(21) Appl. No.: 13/730,482

(22) Filed: Dec. 28, 2012

(65) Prior Publication Data

US 2014/0189417 A1 Jul. 3, 2014

(51) Int. Cl.
*G06F 11/00* (2006.01)
*G06F 11/07* (2006.01)
(52) U.S. Cl.
CPC ............ *G06F 11/004* (2013.01); *G06F 11/006* (2013.01); *G06F 11/0793* (2013.01)
(58) Field of Classification Search
CPC ..................................... G06F 11/07
USPC ..................... 714/6.23, 6.1, 6.12, 6.13, 2, 48
See application file for complete search history.

(56) References Cited

U.S. PATENT DOCUMENTS

| | | | | |
|---|---|---|---|---|
| 5,889,935 | A * | 3/1999 | Ofek et al. ................... | 714/6.23 |
| 6,502,205 | B1 * | 12/2002 | Yanai et al. .................. | 714/6.32 |
| 7,055,059 | B2 * | 5/2006 | Yanai et al. .................. | 714/6.32 |
| 7,818,560 | B2 * | 10/2010 | Li et al. ............................. | 713/2 |
| 7,949,850 | B2 | 5/2011 | Swanson et al. | |
| 2013/0268739 | A1 * | 10/2013 | Gupta et al. .................. | 711/162 |

* cited by examiner

*Primary Examiner* — Dieu-Minh Le
(74) *Attorney, Agent, or Firm* — Blakely, Sokoloff, Taylor & Zafman LLP

(57) ABSTRACT

An apparatus and method are described for performing partial memory mirroring operations. For example, one embodiment of a processor comprises: a processor core for generating a read or write transaction having a system memory address; a home agent identified to service the read or write transaction based on the system memory address; one or more target address decoders (TADs) associated with the home agent to determine whether the system memory address is within a mirrored memory region or a non-mirrored memory region, wherein: if the system memory address is within a mirrored memory region, then the one or more TADs identifying multiple mirrored memory channels for the read or write transaction; and if the system memory address is not within a mirrored memory region, then the one or more TADs identifying a single memory channel for the read or write transaction.

20 Claims, 10 Drawing Sheets

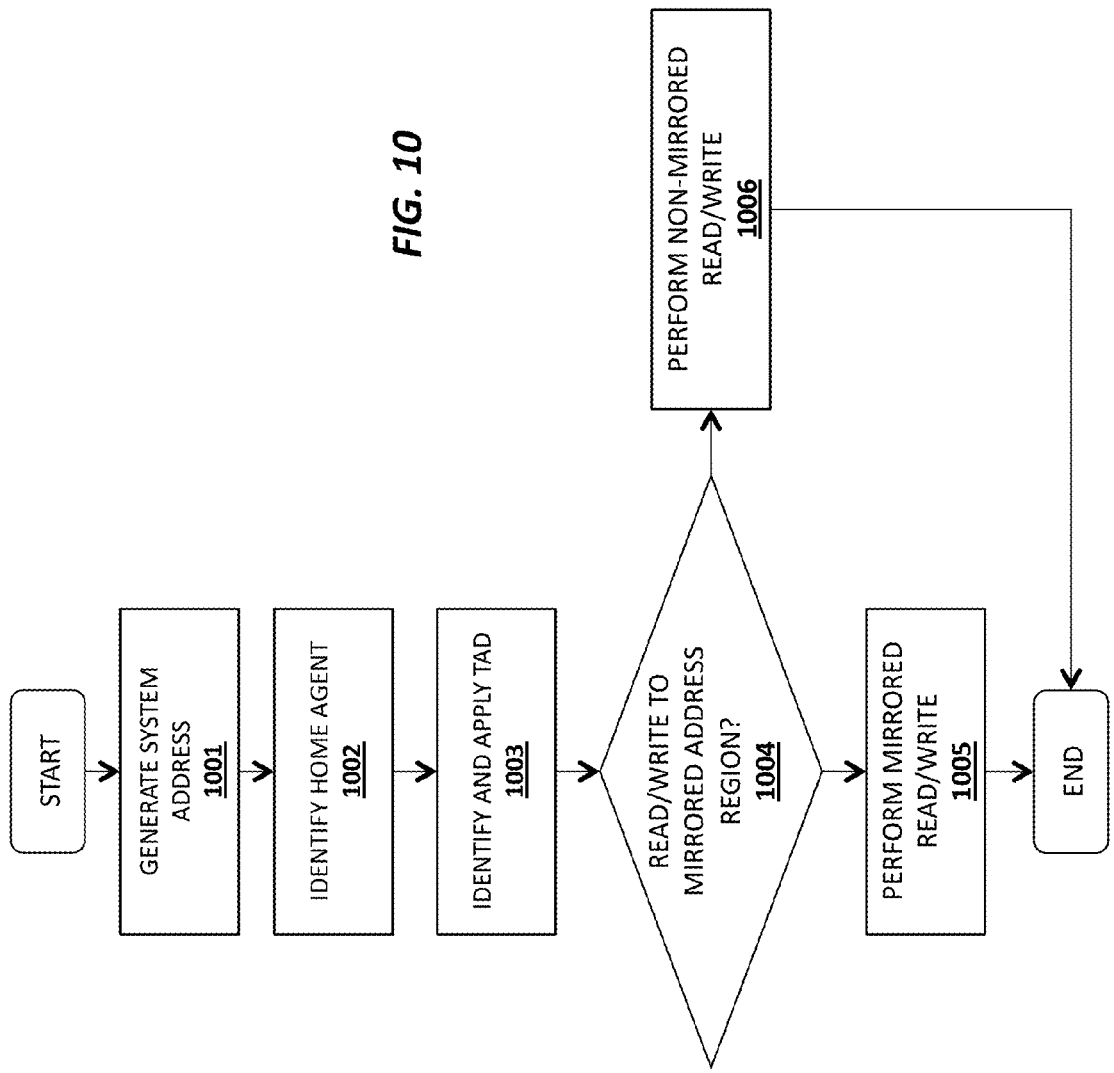

APPARATUS AND METHOD FOR PARTIAL MEMORY MIRRORING

BACKGROUND

1. Field of the Invention

This invention relates generally to the field of computer systems. More particularly, the invention relates to an apparatus and method for partial memory mirroring.

2. Description of the Related Art

In servers, reliability, availability, and serviceability (RAS) features are required to keep a server functional as long as possible. One RAS feature is memory mirroring where dynamic random access memory (DRAM) is mirrored such that uncorrectable errors in memory can be corrected by a mirrored copy. In previous Xeon servers, for example, full memory mirroring is offered where all installed physical DRAM in a single socket is mirrored if so desired. For instance, if a socket has 16 GB of DRAM installed and mirroring is activated, the effective physical memory presented to the operating system would be cut in half to 8 GB, as that 8 GB needs to be mirrored to another 8 GB on the same socket, consuming the full 16 GB.

BRIEF DESCRIPTION OF THE DRAWINGS

A better understanding of the present invention can be obtained from the following detailed description in conjunction with the following drawings, in which:

FIG. 10 illustrates a method in accordance with one embodiment of the invention.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
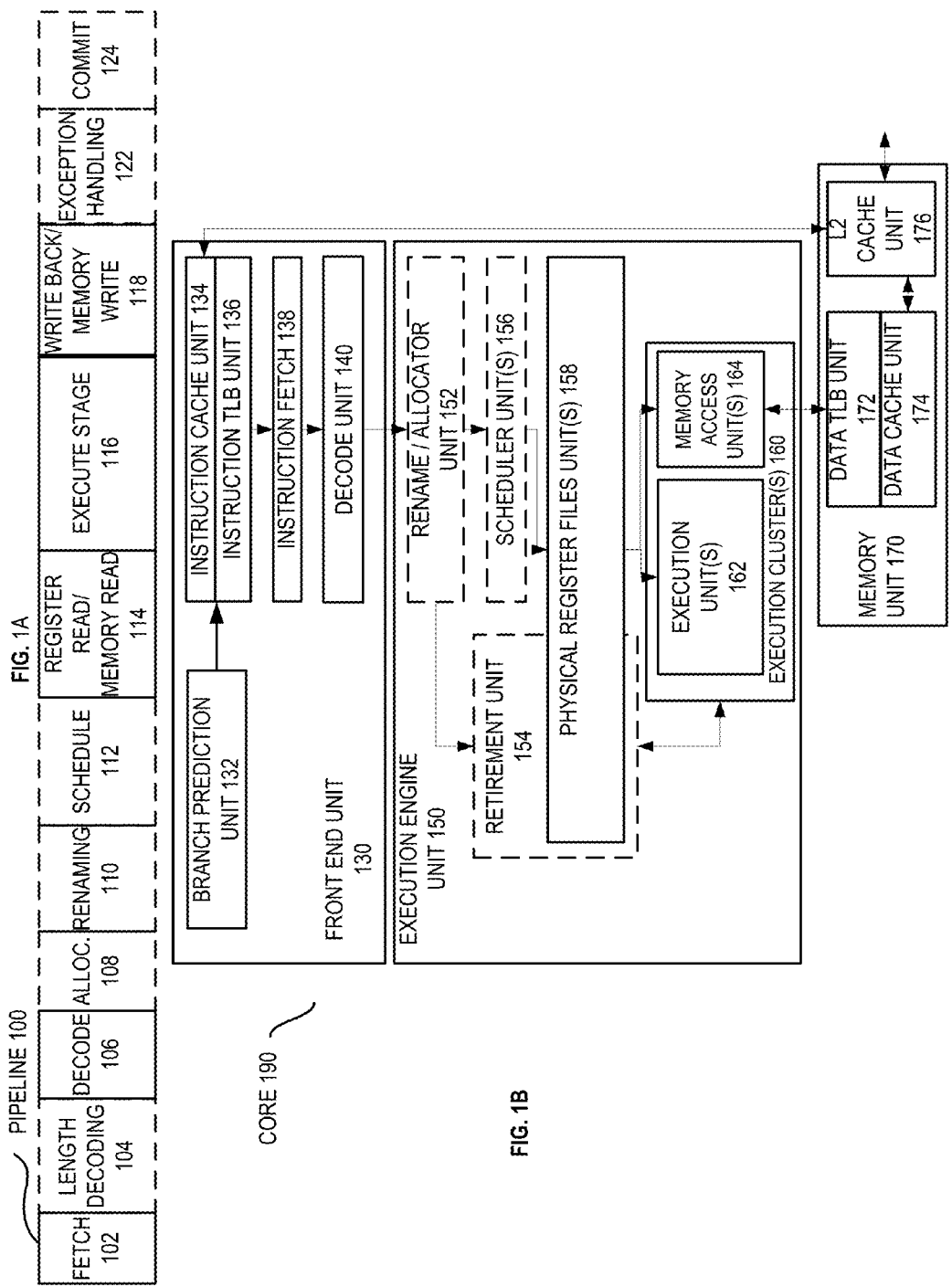
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, microcode entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
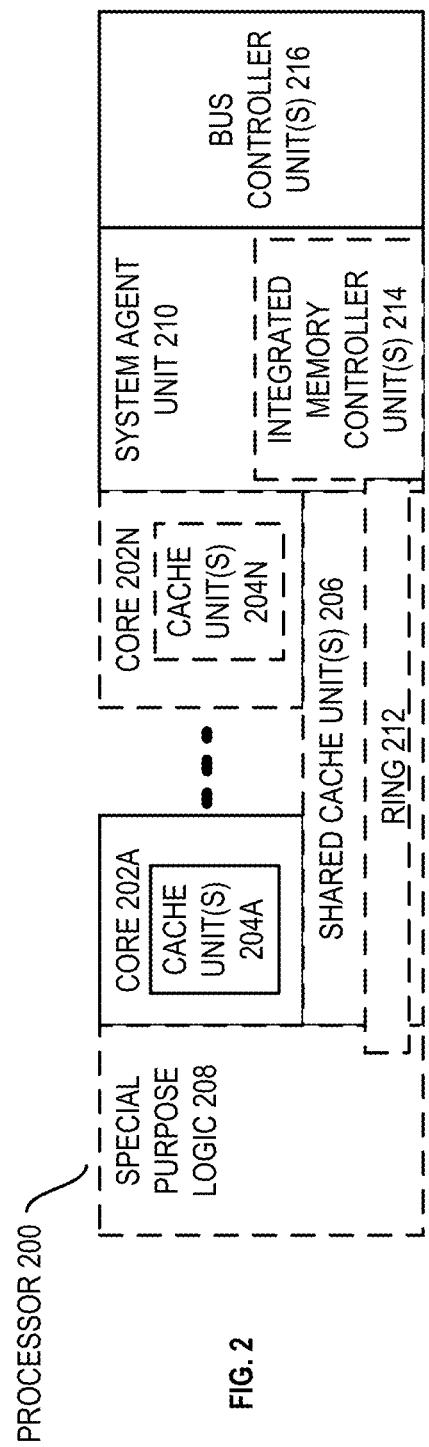
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
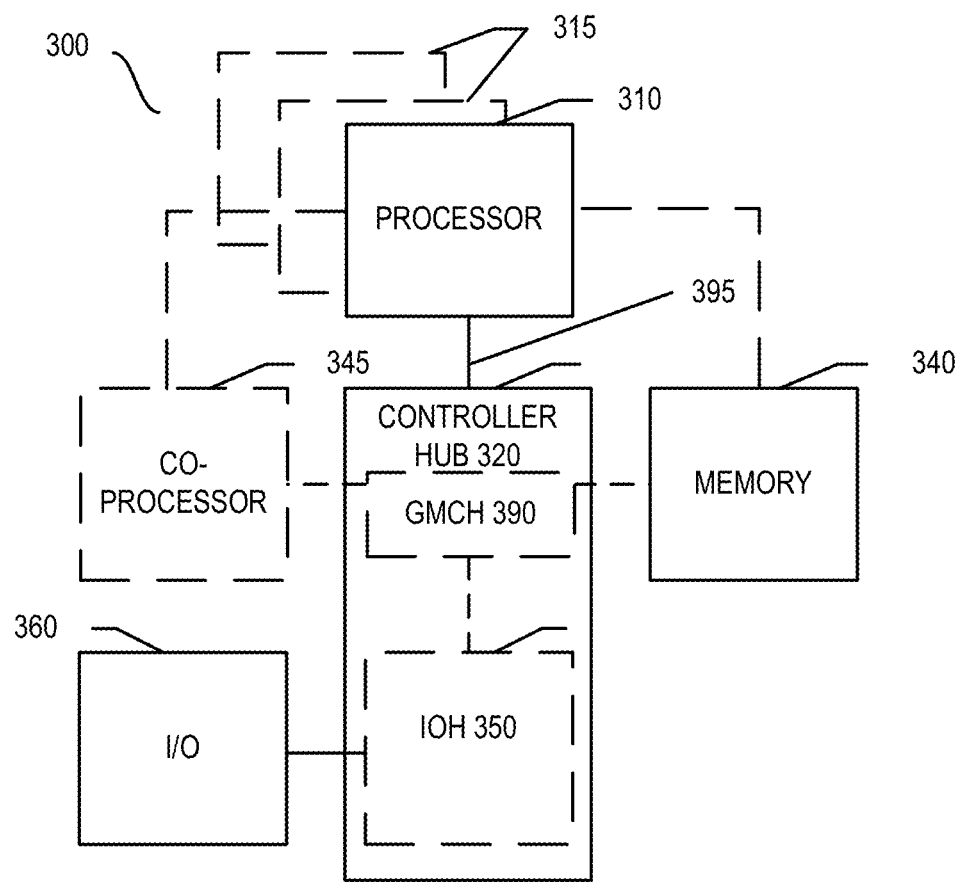
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
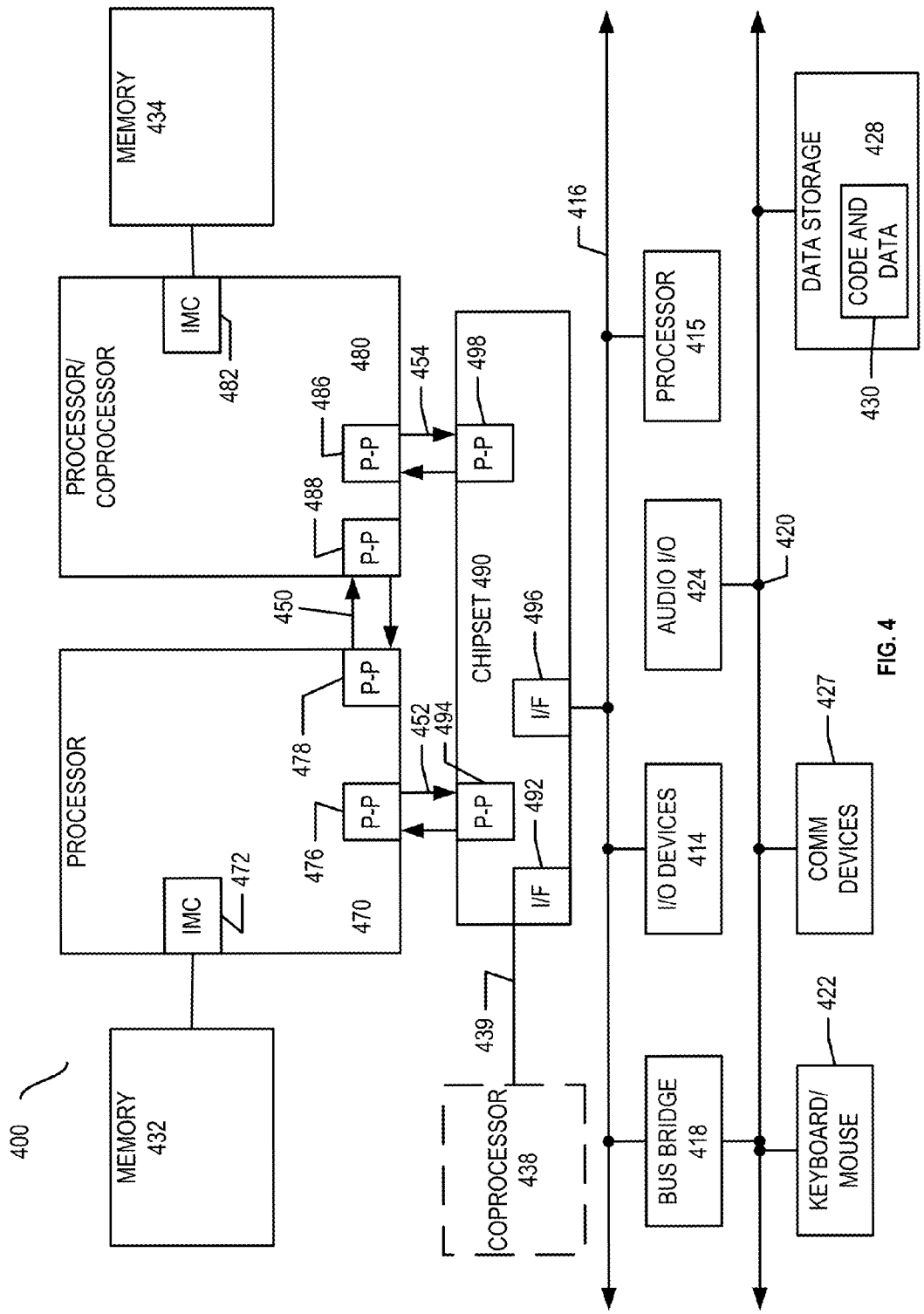
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
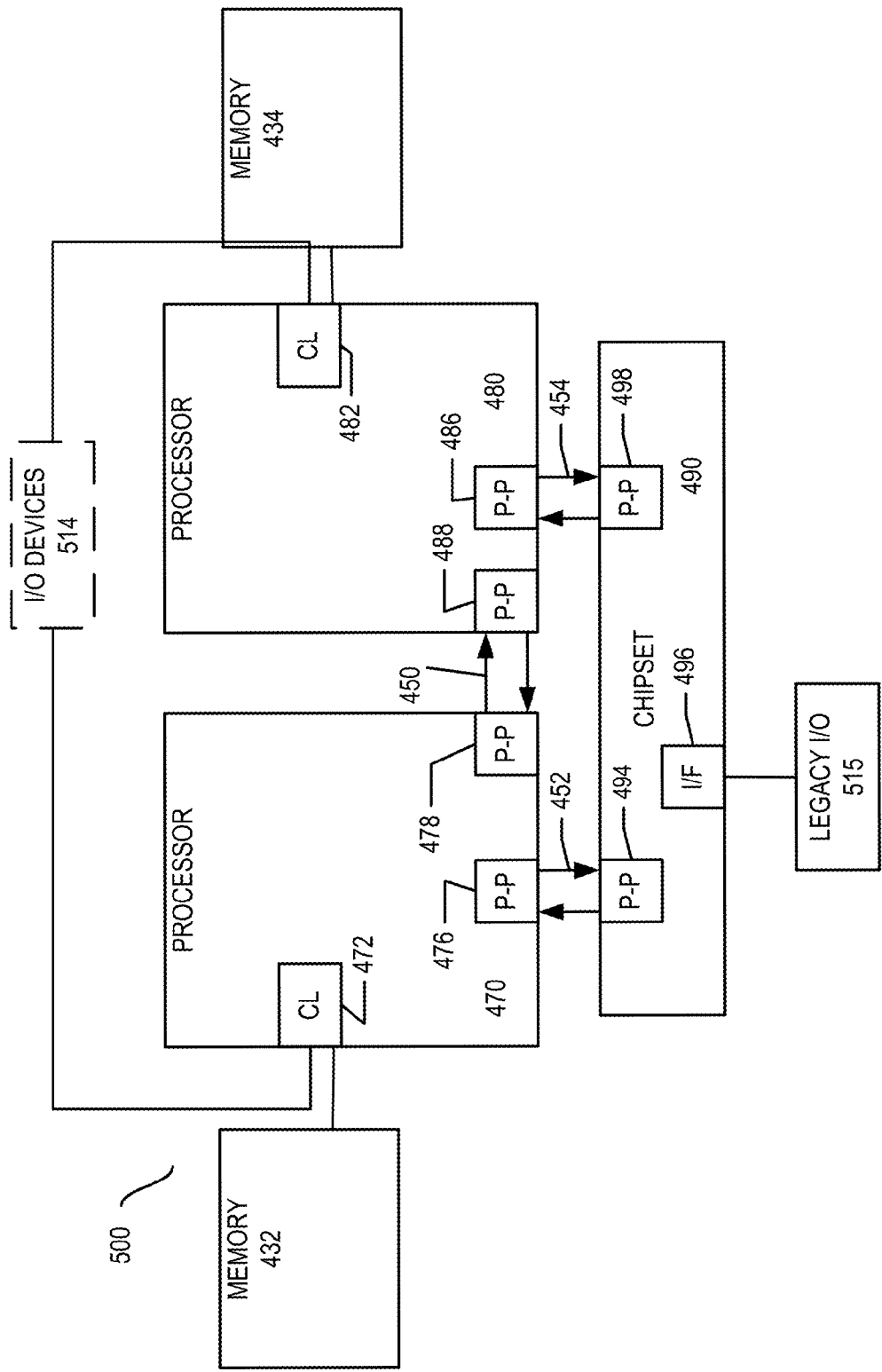
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
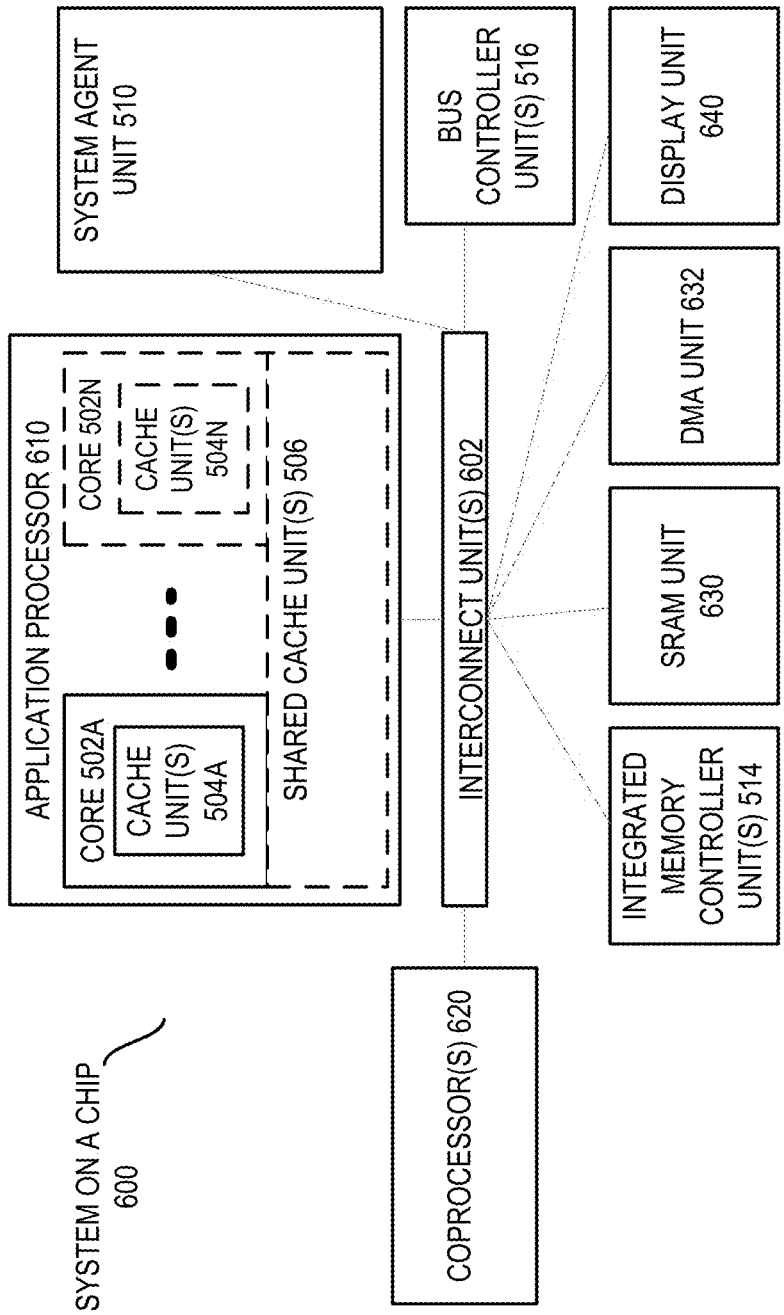
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
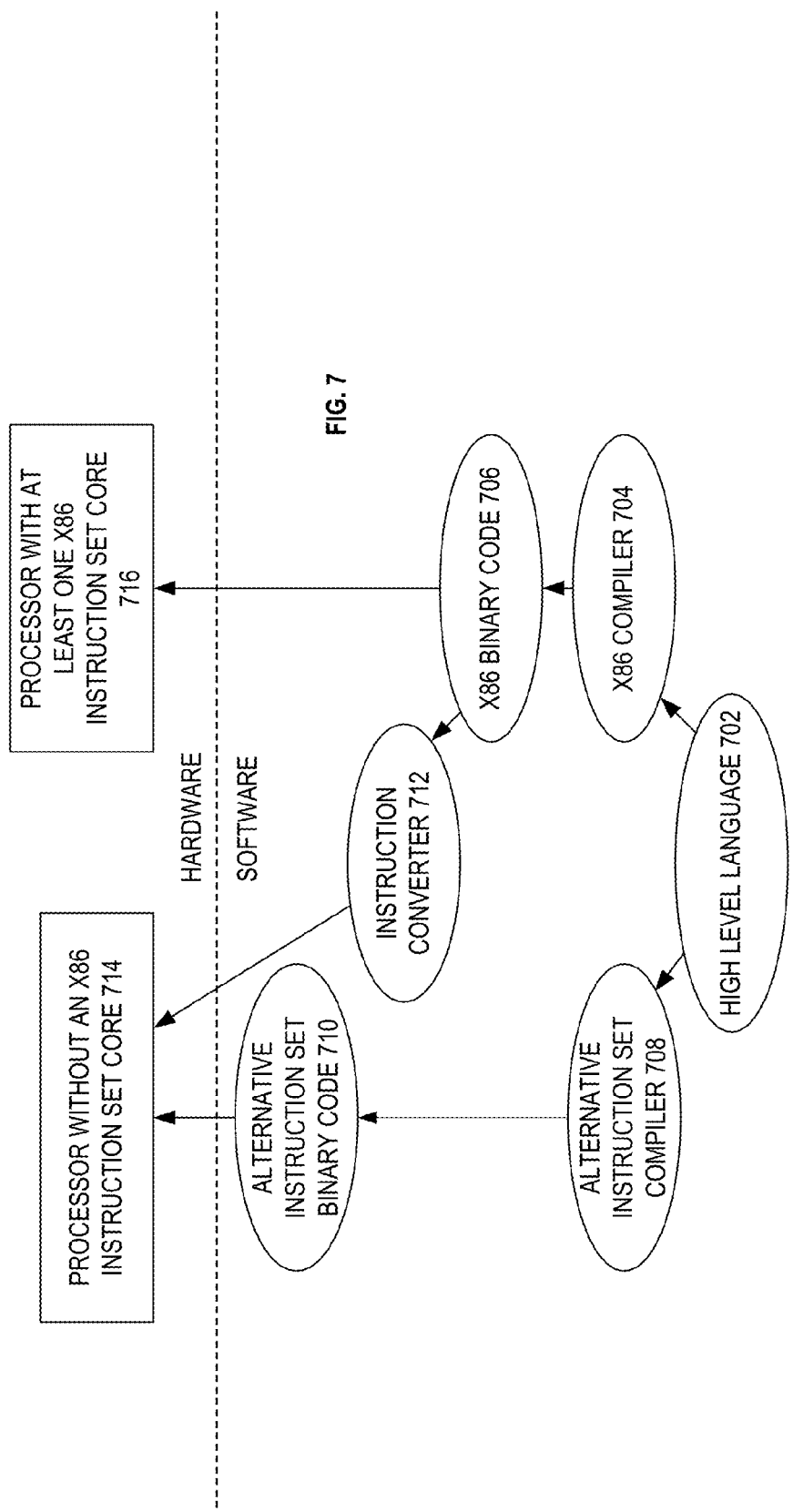
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Partial Memory Mirroring

Many server usage models do not need the full memory to be mirrored. Such redundancy causes memory costs on a server platform to double in some current implementations. To reduce memory requirements, one embodiment of the invention mirrors the OS kernel space or VMM hypervisor space for robustness, leaving the application memory space non-mirrored. To provide this capability, this embodiment of the invention provides partial memory mirroring where a subset of the installed physical dynamic random access memory (DRAM) in a socket (much less than half the total physical DRAM) can be mirrored.

Figure 8:
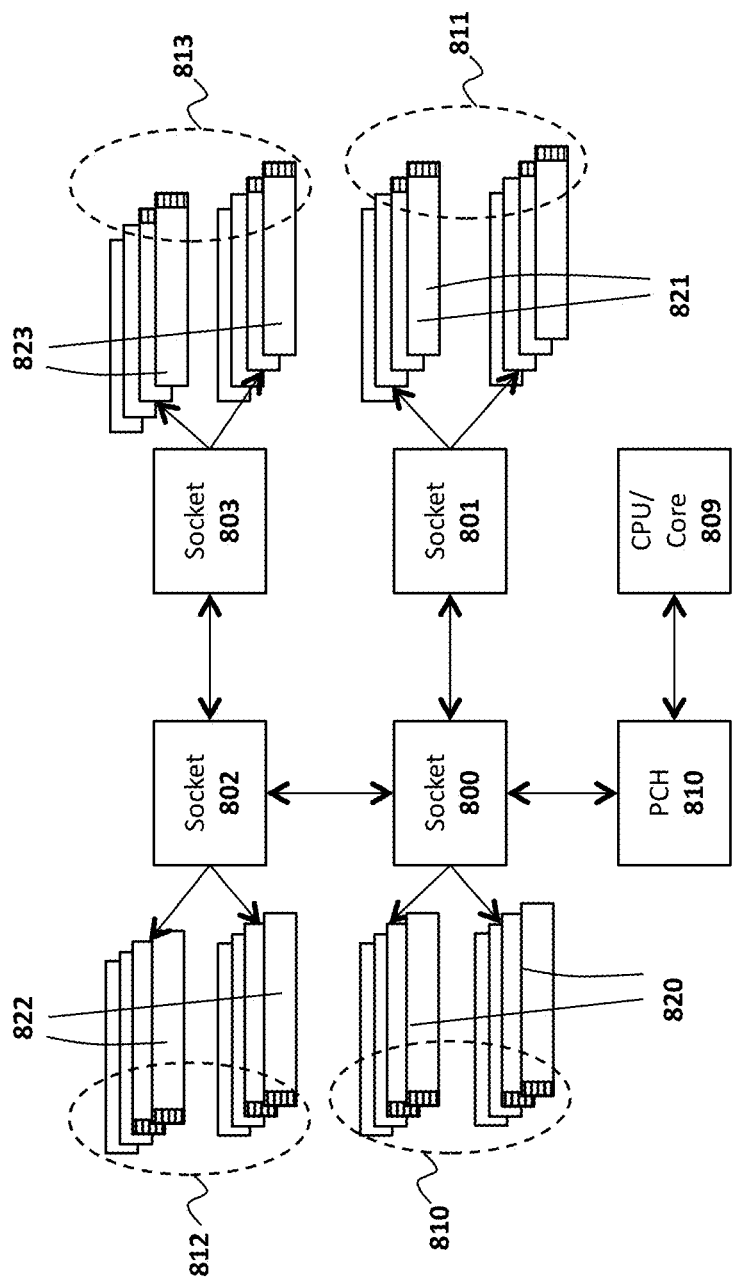
FIG. 8 illustrates a high level view of partial memory mirroring according to one embodiment of the invention.

FIG. 8 illustrates one embodiment of the invention which includes a plurality of memory sockets 800-803 for communicatively coupling a plurality of memory modules 820-823, respectively, to a computer system. In the illustrated embodiment, each socket 800-803 supports eight memory modules which may be dual in-line memory modules (DIMMs). It should be noted, however, that the underlying principles of the invention are not limited to any particular number or type of memory modules.

In this embodiment, partial memory mirroring has been implemented and the mirrored regions 810-813 have been highlighted. If full memory mirroring had been used, these regions would occupy four full regions in a group of eight memory regions. In one embodiment, each socket is a single Haswellserver (HSX) socket designed by the assignee of the present patent application. However, the underlying principles of the invention are not limited to any particular type of memory socket.

FIG. 8 also illustrates a Platform Controller Hub (PCH) coupled to the sockets 800-803 and a central processor unit or processor core 809. The PCH 810 performs various well-known I/O and clocking functions. For example, in one embodiment, the PCH may support the flexible display interface (FDI) and direct media interface (DMI) standards. The operations performed by the PCH 810 are well understood by those of skill in the art and will not be described here in detail in order to avoid obscuring the underlying principles of the invention.

Figure 9:
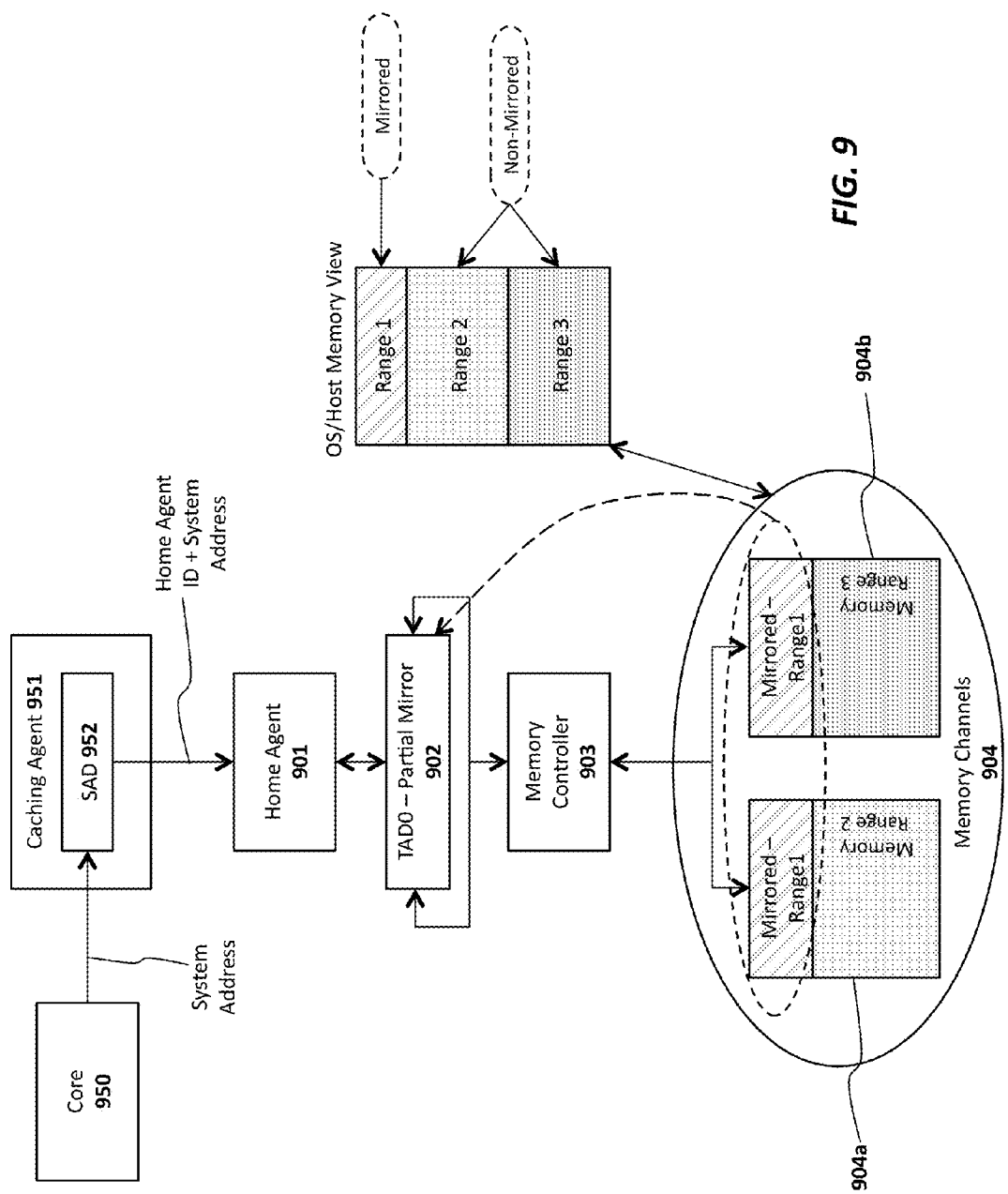
FIG. 9 illustrates one embodiment of an architecture for implementing partial memory mirroring.

Providing partial memory mirroring is not new. However, the embodiments of the invention perform memory mirroring using minimal changes at the architectural level. As illustrated in FIG. 9, in one embodiment, a core 950 includes well known logical components such as a translation lookaside buffer (TLB) (not shown) for translating a virtual address used by software to a physical address, also referred to as a system address. If the virtual-to-physical address mapping is not stored in the TLB, then it is read from a page table in memory.

Once the system address is determined, it may be used in a memory transaction such as a read or write transaction to read or write data from/to memory channels 904, respectively. In the embodiment illustrated in FIG. 9, a caching agent 951 associated with a particular cache level in the hierarchy employed in the computing system (e.g., a last level cache (LLC)) intercepts the memory transaction to identify an appropriate home agent to which the transaction should be directed. In particular, the caching agent 951 includes a system address decoder 952 which uses the system address to identify the home agent 901 responsible for this portion of the system address space. For example, in one embodiment, the system address space is subdivided between multiple home agents 901 (e.g., four home agents may each be responsible for ¼ of the system address space).

Once the correct home agent 901 is identified, it receives the read/write transaction from the caching agent 951. It may then perform the read/write operation in parallel with cache coherency operations (e.g., performing a cache coherency check to ensure that the data, if cached, is valid). In one embodiment of the invention, a bank of target address decoders (TADs) are employed, each of which include a set of TAD rules to map system addresses to particular memory channels and DIMMs (i.e., rank/bank/row/column) controlled by the memory controller 903. The embodiments of the invention use a TAD 902 with TAD rules to specify whether a memory region should be mirrored or not. For example, TAD0 902 specifies memory mirroring for a limited portion of the system address space. System addresses falling in the range of a TAD designated as "mirrored" will have that access mirrored across two DRAM channels 904 (as indicated by the "Mirrored-Range 1" indicated in FIG. 9) while other system addresses falling in other TADs that are not designated "mirrored" will be treated normally (e.g., Range 2 and Range 3 in FIG. 9).

In one embodiment, the granularity of a TAD rule is 64 MB, so the mirrored region can be specified by the TAD in contiguous 64 MB chunks. The benefit of this simple addition to the memory decoding logic allows for a more streamlined mirrored region specification as well as a reduction in validation space as compared to a solution where another set of memory decoders are required.

In one embodiment, the TAD rules are applied by the basic input-output system (BIOS) at boot time. Thus, in this embodiment, an end user may modify these configuration parameters via the BIOS setup. Once the BIOS has configured the memory for partial mirroring, write requests to the mirrored address space are sent to both channels in a mirror pair. For example, in FIG. 9, memory writes to Mirrored Range 1 are written to both memory channels 904. By contrast, non-mirrored writes only target one channel 904a or 904b within a pair (i.e., the TAD-decoded channel). Thus, a TAD will decode writes directed to either Memory Range 2 or Memory Range 3 to a single memory channel 904a or 904b, respectively.

In one embodiment, reads (mirrored or not) are interleaved across the channel pair 904 for performance. Non-mirrored reads that encounter an error will return poisoned data to the requesting thread (assuming read retry is unsuccessful). Mirrored reads encountering an error will retrieve good data from the redundant channel and return that to the requesting thread. Mirrored requests will also scrub the bad data in the originally requested channel (e.g., writing the good data from the redundant channel). In one embodiment, if a re-read of the scrubbed write still results in bad data, the channel is marked "failed" for future requests to the mirrored region. Regardless of the channel decoding, such requests will immediately consult the redundant/good channel to get the data. However, non-mirrored requests will continue to access the "failed" channel and return poison data to the requesting thread if necessary. This feature allows continued uptime for the server at very little incremental memory cost. In the meantime, a service call resolves the faulty memory in the failed channel.

A method according to one embodiment is illustrated in FIG. 10. At 1001, a core performs virtual-to-physical address translation to generate a system address. At 1002, a home agent is identified. For example, as mentioned above different home agents may be responsible for servicing transactions for different portions of the system address space. At 1003, a target address decoder (TAD) is applied based on the system address. As mentioned, a bank of TADs may be employed, each of which include a set of TAD rules to map system addresses to particular memory channels and DIMMs (i.e., rank/bank/row/column).

If the read/write operation is directed to a mirrored address region, determined at 1004, then at 1005, a mirrored read/write operation is performed. For example, a write operation may be concurrently directed over multiple memory channels. A read operation may first attempt to read the data from one channel, but if the data is bad (i.e., poisoned), it may then read the same data from the redundant memory channel. If the read/write operation is directed to a non-mirrored address region, then at 1006, the non-mirrored operation is directed to a single memory channel.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
a processor core for generating a read or write transaction having a system memory address;
a home agent identified to service the read or write transaction based on the system memory address;
one or more target address decoders (TADs) associated with the home agent to determine whether the system memory address is within a mirrored memory region or a non-mirrored memory region, wherein:
if the system memory address is within a mirrored memory region, then the one or more TADs identifying multiple mirrored memory channels for the read or write transaction; and
if the system memory address is not within a mirrored memory region, then the one or more TADs identifying a single memory channel for the read or write transaction.

2. The processor as in claim 1 wherein the transaction comprises a write transaction to write data to the system memory address, wherein the data is written two or more mirrored memory locations over the multiple memory channels identified by the TADs.

3. The processor as in claim 1 wherein the transaction comprises a read transaction to read data from the system memory address, wherein if the system memory address is within a mirrored memory region then the read transaction is first attempted over a first one of the multiple memory channels identified by the TADs.

4. The processor as in claim 3 wherein the read transaction is re-attempted over a second one of the multiple memory channels if the first attempt over the first memory channel results in an error.

5. The processor as in claim 4 wherein the data read from the second memory channel is stored in a memory accessible by the first memory channel in response to the error resulting from the first read attempt over the first memory channel.

6. The processor as in claim 1 wherein each TAD comprises a set of TAD rules, at least TAD rule specifying whether a memory region associated with the TAD is a mirrored memory region or a non-mirrored memory region.

7. The processor as in claim 1 wherein the transaction comprises a read transaction and wherein if the system memory address is not within a mirrored memory region and an error is detected, then poisoned data is returned to a requesting thread.

8. The processor as in claim 1 wherein each memory channel comprises one or more memory sockets into which dual inline memory modules (DIMMs) are plugged.

9. The processor as in claim 1 further comprising:
a caching agent to read the system memory address and responsively identify the home agent responsible for servicing the read or write transaction.

10. The processor as in claim 9 wherein the caching agent comprises a system address decoder to identify the home agent.

11. A method comprising:
generating a read or write transaction having a system memory address;
identifying a home agent to service the read or write transaction based on the system memory address;
identifying one or more target address decoders (TADs) associated with the home agent to determine whether the system memory address is within a mirrored memory region or a non-mirrored memory region, wherein:
if the system memory address is within a mirrored memory region, then the one or more TADs identifying multiple mirrored memory channels for the read or write transaction; and
if the system memory address is not within a mirrored memory region, then the one or more TADs identifying a single memory channel for the read or write transaction.

12. The method as in claim 11 wherein the transaction comprises a write transaction to write data to the system memory address, wherein the data is written two or more mirrored memory locations over the multiple memory channels identified by the TADs.

13. The method as in claim 11 wherein the transaction comprises a read transaction to read data from the system memory address, wherein if the system memory address is within a mirrored memory region then the read transaction is first attempted over a first one of the multiple memory channels identified by the TADs.

14. The method as in claim 13 wherein the read transaction is re-attempted over a second one of the multiple memory channels if the first attempt over the first memory channel results in an error.

15. The method as in claim 14 wherein the data read from the second memory channel is stored in a memory accessible by the first memory channel in response to the error resulting from the first read attempt over the first memory channel.

16. The method as in claim 11 wherein each TAD comprises a set of TAD rules, at least TAD rule specifying whether a memory region associated with the TAD is a mirrored memory region or a non-mirrored memory region.

17. The method as in claim 11 wherein the transaction comprises a read transaction and wherein if the system memory address is not within a mirrored memory region and an error is detected, then poisoned data is returned to a requesting thread.

18. The method as in claim 11 wherein each memory channel comprises one or more memory sockets into which dual inline memory modules (DIMMs) are plugged.

19. The method as in claim 11 further comprising:
reading the system memory address and responsively identifying the home agent responsible for servicing the read or write transaction.

20. The method as in claim 19 wherein the operation of reading the system memory address is performed by a caching agent which comprises a system address decoder to identify the home agent.

* * * * *